United States Patent
Ishigaki et al.

(10) Patent No.: US 6,867,374 B2
(45) Date of Patent: Mar. 15, 2005

(54) CERAMIC INSULATION COATED ELECTRIC WIRE SELF-FUSING CERAMIC INSULATION COATED ELECTRIC WIRE COATING COMPOSITION AND COIL AND VOICES COIL FOR SPEAKER

(75) Inventors: Toshihiro Ishigaki, Yamagata (JP); Yoshitaka Kobayashi, Yamagata (JP); Tomoyuki Shimada, Kanagawa (JP); Masatake Uehara, Nagano (JP)

(73) Assignees: Totoku Electric Co., Ltd., Tokyo (JP); Tohoku Pioneer Corp., Yamagata (JP); Kabushiki Kaisya Nippan Kenkyujo, Kanagawa (JP)

(*) Notice: Subject to any disclaimer, the term of this patent is extended or adjusted under 35 U.S.C. 154(b) by 120 days.

(21) Appl. No.: 10/468,568
(22) PCT Filed: Jan. 22, 2002
(86) PCT No.: PCT/JP02/00446
§ 371 (c)(1),
(2), (4) Date: Aug. 21, 2003
(87) PCT Pub. No.: WO02/059911
PCT Pub. Date: Aug. 1, 2002

(65) Prior Publication Data
US 2004/0076842 A1 Apr. 22, 2004

(30) Foreign Application Priority Data
Jan. 24, 2001 (JP) ........................... 2001-016077

(51) Int. Cl.$^7$ ................................................ H01B 3/00
(52) U.S. Cl. ....................... 174/110 A; 528/15; 525/478
(58) Field of Search .......................... 174/110 A, 110 R, 174/110 S, 120 R; 528/15; 525/478

(56) References Cited

U.S. PATENT DOCUMENTS 5,625,022 A * 4/1997 Onishi ........................ 528/15

FOREIGN PATENT DOCUMENTS

| JP | 64-16868 | * | 1/1989 |
| JP | 8-302285 | * | 11/1996 |
| JP | 09-134615 | | 5/1997 |
| JP | 2000-173354 | | 6/2000 |
| JP | 2001-2988 | | 1/2001 |

* cited by examiner

Primary Examiner—Chau N. Nguyen
(74) Attorney, Agent, or Firm—Jordan and Hamburg LLP

(57) ABSTRACT

A coating composition containing a zirconium compound and a silicon compound is applied on a conductor 1 and baked to develop a ceramic insulating coating 2. A bonding agent made by dissolving a polyamide resin or a polyimide resin into an organic agent is then applied on the ceramic insulating coating 2 and baked to develop a fusible coating 3. This produces a self-fusible ceramic insulation coated wire which can retain the favorable properties of coil at high temperatures. Also, it can be used as windings such as high-power loudspeaker voice coils.

6 Claims, 4 Drawing Sheets

Fig. 1

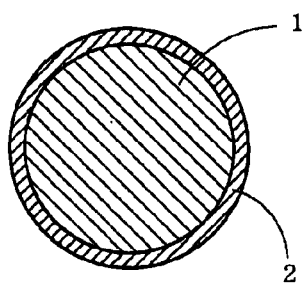

Fig. 2

(parts by weight)

|  |  | composition example 1 | composition example 2 | composition example 3 |
|---|---|---|---|---|
| (a) | dimethyl silicone resin solution | 46 | 60 | 80 |
| (b-1) | zirconium tetra-n-butoxide solution | 10 | 5 | 8 |
| (b-2) | tetra-ethoxysilane solution |  | 10 |  |
| (c-1) | xylene | 44 | 10 | 6 |
| (c-2) | butyl glycol |  | 15 | 6 |
|  | components total | 100 | 100 | 100 |
|  | silicon levelling agent |  | 0.5 | 0.5 |
|  | acetic acid |  | 1.5 | 1 |

(a) Solids content in a dimethyl silicone resin solution is 55 %.
(b-1) Solids content in a zirconium tetra-n-butoxide solution is 31 %.
(b-2) Solids content in a tetra-ethoxysilane solution is 42 %.

CERAMIC INSULATION COATED ELECTRIC WIRE SELF-FUSING CERAMIC INSULATION COATED ELECTRIC WIRE COATING COMPOSITION AND COIL AND VOICES COIL FOR SPEAKER

FIELD OF THE INVENTION

The present invention relates to a ceramic insulation coated wire, a self-fusible ceramic insulation coated wire, a coating compound, a coil, and a voice coil for a loudspeaker. More particularly, the invention relates to a ceramic insulation coated wire and a self-fusible ceramic insulation coated wire which both can retain the characteristics of coil at higher temperatures, a coating compound from which the ceramic insulation coated wire is fabricated, and a coil and a loudspeaker voice coil employing the ceramic insulation coated wires.

BACKGROUND OF THE INVENTION

Loudspeaker voice coils and motor coils have been proposed in the form of coils where self-fusible wires are wound as a regular winding.

Such a self-fusible wire is commonly coated with an insulating layer of an insulating material such as polyester. The wire also has a fusible layer made of alcohol dissolvable polyamide resin dissolved in an organic solvent.

As electric appliances have been advanced in the performance, their loudspeaker voice coils or motor coils are heavily loaded and have to be improved in the resistance to heat.

However, the heat resisting temperature of the insulating layer is substantially 350° C. When its self-fusible wire is heated up to 350° C. or higher, the coil may be declined in the properties.

It is hence a first object of the present invention to provide a ceramic insulation coated wire and a self-fusible ceramic insulation coated wire which both retain the characteristics of coil at higher temperatures.

It is a second object of the present invention to provide a coating composition for fabricating the ceramic insulation coated wire.

It is a third object of the present invention to provide a coil and a loudspeaker voice coil which employ the ceramic insulation coated wire.

SUMMARY OF THE INVENTION

As a first feature of the present invention, a ceramic insulation coated wire is characterized by a ceramic insulating coating, which is made of a coating composition containing a zirconium compound and a silicon compound and defined by a third feature described later, applied on a conductor and thermally cured.

The ceramic insulation coated wire of the first feature has the ceramic insulating coating made by the coating compound, which contains a zirconium compound and a silicon compound, directly applied and thermally cured on the conductor and can thus retain the favorable properties of coil at high temperatures while being highly flexible and resistive to heat.

As a second feature of the present invention, a self-fusible ceramic insulation coated wire is characterized by a fusible coating, which is a bonding agent having a polyamide resin or a polyimide resin dissolved in an organic agent, applied on the ceramic insulating coating of the ceramic insulation coated wire of the first feature and thermally cured.

The self-fusible ceramic insulation coated wire of the second feature can hence retain the favorable properties of coil while being resistive to heat.

As a third feature of the present invention, a coating composition is provided comprising:
(a) 5 to 55 parts by weight on a solids content basis of at least an organo-polysiloxane selected from its group expressed by the general formula:

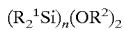

$(R_2^1Si)_n(OR^2)_2$ where $R^1$ is an organic radical containing 1 to 8 carbons and $R^2$ is an alkyl radical containing 1 to 5 carbons and/or an acyl radical containing 1 to 4 carbons;
(b) 0.5 to 15 parts by weight on a solids content basis of a mixture of at least a zirconium compound selected from zirconium tetra-alkoxide expressed by the general formula, $Zr(OR)_4$ where R is a hydrocarbon residue containing 1 to 5 carbons, a hydrolysate of the zirconium tetra-alkoxide, and a partial condensate of the hydrolysate and/or at least a silane compound selected from tetra-alkoxy silane expressed by the general formula, $Si(OR)_4$ where R is a hydrocarbon residue containing 1 to 5 carbons, a hydrolysate of the tetra-alkoxy silane, and a partial condensate of the hydrolysate, with the zirconium compound; and
(c) 30 to 94.5 parts by weight of an organic solvent, wherein (a)+(b)+(c)=100 parts by weight.

Since the coating composition of the third feature contains a zirconium compound and/or a silane-zirconium compound, each of which is highly fast in the reaction, heat resistant, corrosive resistant and durable, and an organo-polysiloxane, and it generates a highly heat resistant and flexible insulating coating, it can successfully be used for fabricating the ceramic insulation coated wire or the self-fusible ceramic insulation coated wire.

The components (a), (b), and (c) may contain desired additives including organic acid, inorganic acid, surface active agent, coupling agent, chelate, and inorganic pigment.

Organo-polysiloxane in the component (a) acts as an insulating coating agent which is highly resistant to heat and flexible.

Organo-polysiloxane is prepared through dehydrating condensation of a hydrolysate of alkoxy silane or alkyl silane halide with pure silicone varnish. This is a silicon polymer having a main chain of siloxane (—Si—O—Si—) bonds and side chains of methyl radical and phenyl radical, where an initial condensate of monomethyl or monotrichlorosilane added with dimethyl, diethyl, and dichlorosilane is dissolved in a solvent. As the result, the condensation of hydroxyl radicals remaining in the polysiloxane is further proceeded thus creating a three-dimensional network structure. When the alkyl radical is methyl, the resistance to heat and thus the water repellent effect will be maximum. Therefore, organo-polysiloxane in the coating composition according to the present invention may preferably be dimethyl silicone resin.

The solids content in organo-polysiloxane of the component (a) is generally 45 to 60% by weight and preferably 50 to 55% by weight.

The component (a) in the coating composition is on a solids content basis 5 to 55 parts by weight and preferably 25 to 50 parts by weight. If the component (a) is not greater than 5 parts by weight, the coating thickness will be too small. Also, the component (c) will relatively be increased thus declining the bonding strength. If the component (a) exceeds 55 parts by weight, the viscosity will be increased thus declining the working efficiency or the coating thickness will be increased hence causing fracture.

Zirconium tetra-alkoxide in the component (b) is hydrolyzed with a very small amount of water thus generating a zirconium tetra-alkoxide hydrolysate. Simultaneously, the hydrolysate is poly-condensed thus creating a partial condensate and polymerized generating a thin film with time. Accordingly, the component (b) collaborates with the component (a) to develop a highly heat resistant coating and also promotes the curing action, the high density, and the resistance to heat of the component (a).

Zirconium tetra-alkoxide in the component (b) is highly responsive to both the hydrolysis and the poly-condensation and can thus be cured within a short time at a lower temperature in combination with the component (a).

R in zirconium tetra-alkoxide may be selected from alkyl radicals containing 1 to 5 carbons, methyl radicals, ethyl radicals, n-butyl radicals, sec-butyl radicals, and n-propyl radicals. More specifically, favored are zirconium tetra-methoxide, zirconium tetra-ethoxide, zirconium tetra-n-butoxide, zirconium tetra-sec-butoxide, zirconium tetra-propoxide, and their combination of two or more. Preferably, the component (b) is zirconium tetra-n-butoxide.

Zirconium tetra-alkoxide in the component (b) also includes a hydrolysate of zirconium tetra-alkoxide and a partial poly-condensate of the hydrolysate. The hydrolysate and/or the partial poly-condensate may be a product from zirconium tetra-alkoxide in a mixture or be added to the mixture in advance.

Tetra-alkoxysilane in the component (b) like zirconium tetra-alkoxide is gradually hydrolyzed under the presence of water thus generating a tetra-silanol hydrolysate. Simultaneously, the hydrolysate is poly-condensed thus creating a partial condensate and polymerized generating a thin film with time. Accordingly, the component (b) serves as a highly heat resistance coating agent and promotes the curing action, the high density, and the resistance to heat of the component (a).

Tetra-alkoxysilane is less responsive to both the hydrolysis and the poly-condensation than zirconium tetra-alkoxide. A combination of the two components can thus permit a moderate speed of the hydrolysis, thus improving the working operability, optimizing the coating hardness (flexibility) and avoiding the fracture.

R in tetra-alkoxysilane may be selected from alkyl radicals containing 1 to 5 carbons, methyl radicals, ethyl radicals, n-butyl radicals, n-propyl radicals, and i-propyl radicals. More specifically, favored are tetra-methoxysilane, tetra-ethoxysilane, tetra-n-butoxysilane, tetra-n-propoxysilane, and their combination of two or more. Preferably, the component (b) is tetra-ethoxysilane.

Tetra-ethoxysilane in the component (b) also includes a hydrolysate of tetra-ethoxysilane and a partial condensate of the hydrolysate. The hydrolysate and/or the partial condensate may be a product from tetra-alkoxysilane or be added in advance during the preparation of the composition.

When zirconium tetra-alkoxide and tetra-alkoxysilane are used in a combination in the component (b), their ratio is 20–70:30–80 in parts by weight and preferably 30–60:40–70 in parts by weight (a sum being 100 parts by weight).

The component (b) in the coating composition is on a solids content basis 0.5 to 15 parts by weight and preferably 1 to 5 parts by weight. When the component (b) is smaller than 0.5 parts by weight, the curing action may be retarded or the resistance to heat may be declined. On the other hand, when 15 parts or greater, the reaction may be too fast. As the curing action speeds up, the coating may be flawed or peeled.

The organic solvent in the component (c) is a mixture dispersant and a density adjuster for the other components (a) and (b). It may also serve as a curing speed modifier.

The organic solvent in the component (c) may be selected from low boiling-point organic solvents, glycol derivatives, and alcohols. More specifically, favored are xylene, toluene, methyl ethyl ketone, ethylene glycol, ethylene acetate, ethylene glycol mono-ethyl ether, diethylene glycol mono-butyl ether, n-butyl alcohol, methanol, ethanol, and their combination of two or more.

The organic solvent of the component (c) includes organic solvents contained in the other components (a) and (b).

The component (c) in the coating composition is 30 to 94.5 parts by weight and preferably 40 to 80 parts by weight. When the component (c) is smaller than 30 parts by weight, the viscosity of the composition may be increased thus declining the working efficiency or the coating thickness may be increased thus causing a fracture. On the other hand, when 94.5 parts or greater, the coating may be thinned thus declining the insulating effect.

As a fourth feature of the present invention, a coil having the foregoing ceramic insulation coated wire is characterized in that the ceramic insulation coated wire is wound and held in a coil form by the action of a bonding agent applied over the ceramic insulation coated wire.

The coil of the fourth feature employs the ceramic insulation coated wire and can thus be improved in the resistance to heat and successfully used at higher temperatures. Also, because of its fusible coating, the coil can favorably be retained in a coil shape.

As a fifth feature of the present invention, a coil having the ceramic insulation coated wire is characterized in that the ceramic insulation coated wire is wound and held in a coil form by the action of the foregoing coating composition on the ceramic insulation coated wire.

Since the coil of the fifth feature employs the ceramic insulation coated wire and the coating composition for retaining the coil shape, it can be improved in the resistance to heat and favorably used at high temperatures while remaining consistently held in the shape.

As a sixth feature of the present invention, a loudspeaker voice coil is characterized by the foregoing ceramic insulation coated wire or the foregoing self-fusible ceramic insulation coated wire.

Since the loudspeaker voice coil of the sixth feature employs the foregoing ceramic insulation coated wire or the foregoing self-fusible ceramic insulation coated wire, it can be improved in the resistance to heat and favorably used at high temperatures particularly in a high-power loudspeaker.

BRIEF DESCRIPTION OF THE DRAWINGS

FIG. 1 is a cross sectional view of a ceramic insulation coated wire showing the first embodiment of the present invention;

FIG. 2 is a table showing examples of the coating composition according to the present invention;

BEST MODES FOR EMBODYING THE INVENTION

Figure 3:
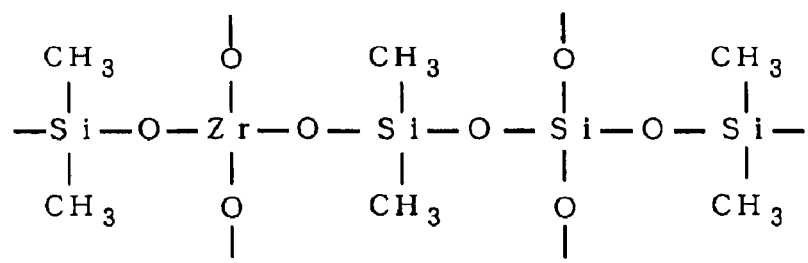
FIG. 3 is an explanatory view of the general formula of a ceramic insulating coating according to the present invention.

Some preferred embodiments of the present invention will be described referring to the relevant drawings. It would be understood that the present invention is not limited to the embodiments.

(First Embodiment)

FIG. 1 is a cross sectional view of a ceramic insulation coated wire 10 showing a first embodiment of the present invention.

The ceramic insulation coated wire 10 has a conductor 1 covered at the outer surface with a ceramic insulating coating 2.

The conductor 1 is a copper wire of 0.02 to 0.5 mm in diameter.

The ceramic insulating coating 2 is fabricated by a coating composition 1, a coating composition 2, or a coating composition 3 listed in FIG. 2 applied onto the conductor 1 and thermally cured (with heat). The thickness of the ceramic insulating coating 2 ranges 3 to 12 $\mu$m.

FIG. 3 illustrates a chemical formula of the ceramic insulating coating 2.

(Second Embodiment)

Figure 4:
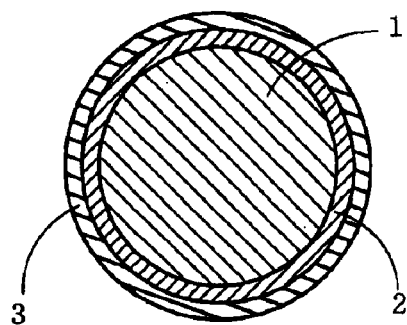
FIG. 4 is a cross sectional view of a self-fusible ceramic insulation coated wire showing the second embodiment of the present invention.

FIG. 4 is a cross sectional view of a self-fusible ceramic insulation coated wire 20 showing a second embodiment of the present invention.

The self-fusible ceramic insulation coated wire 20 has the ceramic insulation coated wire 10 covered at the outer surface with a fusible coating 3.

The fusible coating 3 is fabricated by a coating agent, which is polyamide resin or polyimide resin dissolved in an organic solution, applied onto the ceramic insulation coated wire 10 and thermally cured (with heat). The thickness of the fusible coating 3 ranges 3 to 10 $\mu$m.

The polyamide resin is selected from

M1178 and M1603, the products of Elf Atchem, Germany.

The polyimide resin is BT2100, the product of Mitsubishi Gas Chemicals.

(Third Embodiment)

Figure 5:
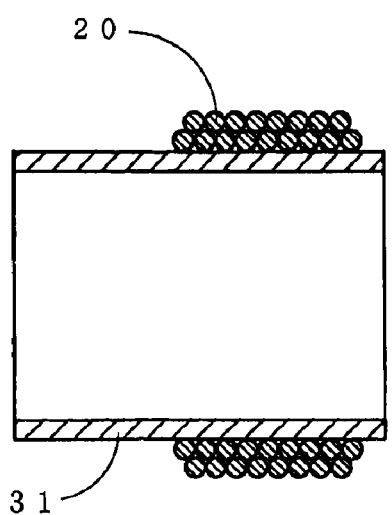
FIG. 5 is a cross sectional view of a loudspeaker voice coil showing the third embodiment of the present invention.

FIG. 5 is a cross sectional view of a loudspeaker voice coil 30 showing a third embodiment of the present invention.

The loudspeaker voice coil 30 has the self-fusible ceramic insulation coated wire 20 (of 0.25 mm in outer diameter) wound on the outer surface of a cylindrical bobbin 31 to form turns of winding (having a resistance of 3.5 Ω) and then heated at 190° C. for 30 minutes for fusing the turns of winding together. The fusible coating 3 on the self-fusible ceramic insulation coated wire 20 is a polyamide varnish.

The bobbin 31 is made of a glass fiber cloth coated with polyimide resin.

Figure 6:
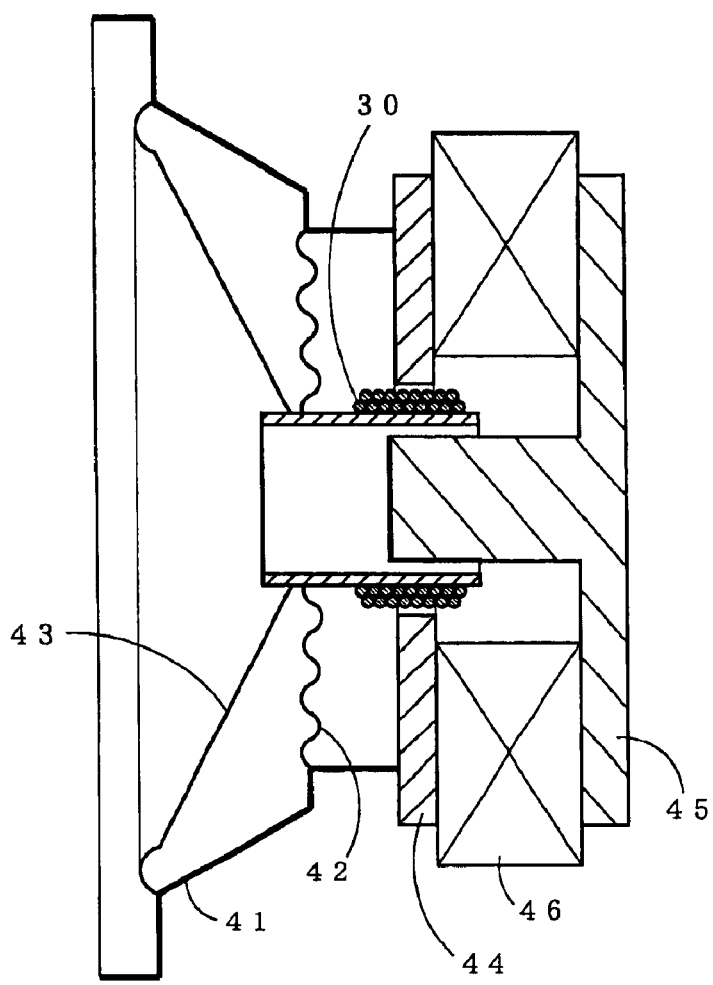
FIG. 6 is a cross sectional view of a high-power loudspeaker employing the loudspeaker voice coil of the third embodiment.

FIG. 6 is a cross sectional view of a high-power loudspeaker 40 which employs the loudspeaker voice coil 30.

The high-power loudspeaker 40 has a structure comprising the loudspeaker voice coil 30 supportingly mounted by a damper 42 to a frame 41, a diaphragm 43 provided on an edge 47 between the voice coil 30 and the frame 41, a magnetic circuit composed of the frame 41, a plate 44, a yoke 45, and a magnet 46. The diameter of the high-power loudspeaker 40 is 17 cm.

Figure 7:
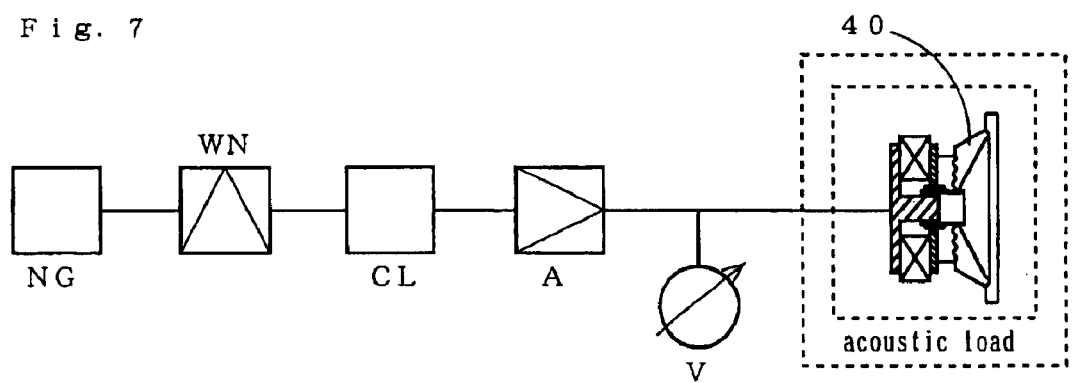
FIG. 7 is a block diagram of a test circuit for a loudspeaker.

FIG. 7 is a block diagram of a test circuit for the high-power loudspeaker 40.

A pink noise is generated by a pink noise generator NG, transferred through a waiting network WN (which conforms to IEC268-1C), a clipping circuit CL, and an amplifier A, and played back by the high-power loudspeaker 40. Also, the voltage is measured by an RMS voltmeter V for calculation of a power.

The test was carried out through repeating ten times a step of driving at an initial test input watt value for one minute and providing a pausing time of two minutes and then calculating the temperature from the measurement of resistance on the loudspeaker voice coil 30. The test was repeated by increasing 10 W in steps until the voice coil 30 was broken down.

Figure 8:
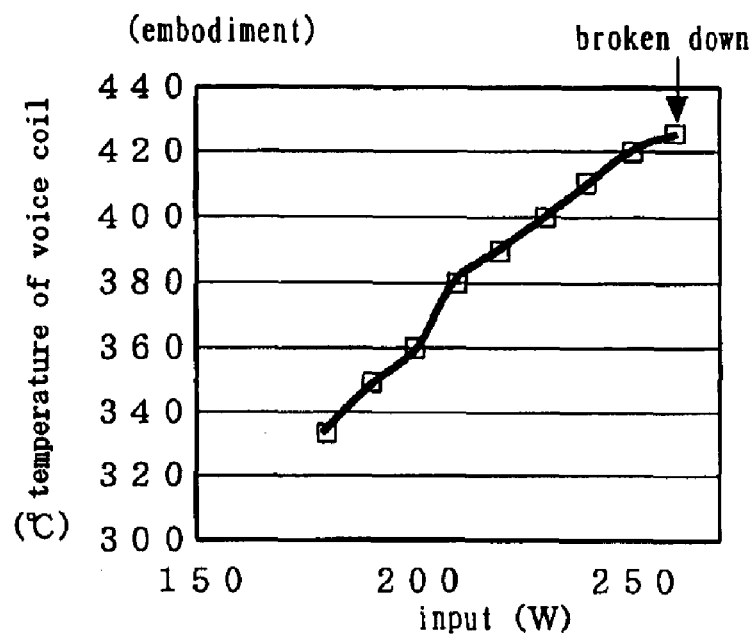
FIG. 8 is a characteristic diagram showing the result of a test of the high-power loudspeaker employing the loudspeaker voice coil of the third embodiment.

The result of the test is shown in FIG. 8 where the high-power loudspeaker 40 remains not broken down before 250 W.

More particularly as the result of the test shown in FIG. 8, the fusible coating of polyamide varnish was melted down by heat thus removing from the bobbin 31 the wire which then collided with the plate 44 or the yoke 45 and was broken down. When the voice coil is cut out, its ceramic insulation coated wire remains not melted down but covering over the wire, thus retaining the insulating properties.

Figure 9:
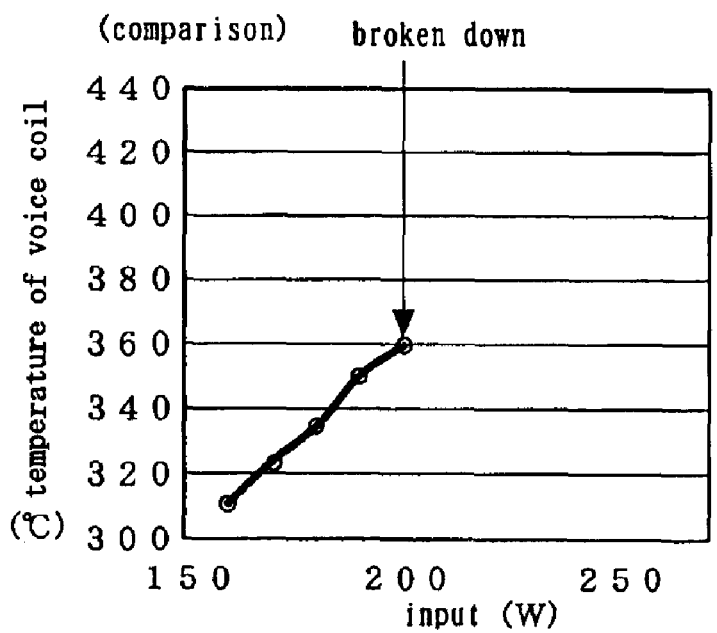
FIG. 9 is a characteristic diagram showing the result of a test of a comparison loudspeaker.

FIG. 9 illustrates the result of another test for comparison. The comparison of a loudspeaker was broken down at 200 W.

The loudspeaker of the comparison had a voice coil fabricated by a self-fusible wire (AIW wire of Totoku Electric) covered with a fusible coating of polyamide varnish and wound over an amide-imide insulating coating which replaced the ceramic insulating coating 2.

The broken-down resulted from thermally melting down of the amide-imide insulating coating and the fusible coating of polyamide varnish to release the coil which then collided with a plate 44.

(Fourth Embodiment)

The ceramic insulation coated wire 10 (of 0.25 mm in outer diameter) was covered with a coating of which the component was identical to that of the ceramic insulating coating 2 and wound in two layers (80 turns in the first layer and 70 turns in the second layer) over the outer surface of a cylindrical bobbin of 30 mm in diameter.

The coil was energized and its surface temperature was measured as the energizing current was gradually increased. The measurement was found no fault at 500° C.

A comparison coil was fabricated by an amide-imide insulation coated wire (of 0.25 mm in outer diameter) covered with a coating of polyamide varnish and wound in two layers (80 turns in the first layer and 70 turns in the second layer) over the outer surface of a cylindrical bobbin of 30 mm in diameter.

The comparison coil was energized and its surface temperature was measured as the energizing current was gradually increased. As the result, a short circuit occurred at 451° C.

The coating composition according to the present invention is favorable for use as a heat-resistant insulating coating over any metal material.

Industrial Applicability

As set forth above, the ceramic insulation coated wire and the self-fusible ceramic insulation coated wire according to the present invention can retain the desired properties of coil at high temperatures.

Also, the coating composition according to the present invention is favorably used for fabricating the ceramic insulation coated wire or the self-fusible ceramic insulation coated wire. It can equally be utilized for heat-resistant insulation on over any metal material.

Moreover, the coil and the loudspeaker voice coil according to the present invention can be improved in the resistance to heat and favorably used under a high-temperature environment.

What is claimed is:

1. A ceramic insulation coated wire characterized by a ceramic insulating coating, which is made of a coating composition containing a zirconium compound and a silicon compound, applied on a conductor and thermally cured, the coating composition comprising:

(a) 5 to 55 parts by weight on a solids content basis of at least an organo-polysiloxane selected from its group expressed by the general formula:

$(R_{1/2}Si)_n(OR^2)_2$ where $R^1$ is an organic radical containing 1 to 8 carbons and $R^2$ is an alkyl radical containing 1 to 5 carbons and/or an acyl radical containing 1 to 4 carbons;

(b) 0.5 to 15 parts by weight on a solids content basis of a mixture of at least a zirconium compound selected from zirconium tetra-alkoxide expressed by the general formula, $Zr(OR)_4$ where R is a hydrocarbon residue containing 1 to 5 carbons, a hydrolysate of zirconium tetra-alkoxide, and a partial condensate of the hydrolysate and/or at least a silane compound selected from tetra-alkoxy silane expressed by the general formula, $Si(OR)_4$ where R is a hydrocarbon radical containing 1 to 5 carbons, a hydrolysate of tetra-alkoxy silane, and a partial condensate of the hydrolysate, with the zirconium compound; and (c) 30 to 94.5 parts by weight of an organic solvent, wherein (a)+(b)+(c)=100 parts by weight.

2. A coating composition comprising:

(a) 5 to 55 parts by weight on a solids content basis of at least an organo-polysiloxane selected from its group expressed by the general formula:

$(R_{1/2}Si)_n(OR^2)_2$ where $R^1$ is an organic radical containing 1 to 8 carbons and $R^2$ is an alkyl radical containing 1 to 5 carbons and/or an acyl radical containing 1 to 4 carbons;

(b) 0.5 to 15 parts by weight on a solids content basis of a mixture of at least a zirconium compound selected from zirconium tetra-alkoxide expressed by the general formula, $Zr(OR)_4$ where R is a hydrocarbon residue containing 1 to 5 carbons, a hydrolysate of zirconium tetra-alkoxide, and a partial condensate of the hydrolysate and/or at least a silane compound selected from tetra-alkoxy silane expressed by the general formula, $Si(OR)_4$ where R is a hydrocarbon residue containing 1 to 5 carbons, a hydrolysate of tetra-alkoxy silane, and a partial condensate of the hydrolysate, with the zirconium compound; and (c) 30 to 94.5 parts by weight of an organic solvent, wherein (a)+(b)+(c)=100 parts by weight.

3. A self-fusible ceramic insulation coated wire characterized by a fusible coating, which is a bonding agent having a polyamide resin or a polyimide resin dissolved in an organic agent, applied on the ceramic insulating coating of the ceramic insulation coated wire defined in claim 1 and thermally cured.

4. A coil having the ceramic insulation coated wire defined in claim 1, characterized in that the ceramic insulation coated wire is wound and held in a coil form by the action of a bonding agent applied over the ceramic insulation coated wire.

5. A coil having the ceramic insulation coated wire defined in claim 1, characterized in that the ceramic insulation coated wire is wound and held in a coil form by the action of the coating composition on the ceramic insulation coated wire defined in claim 2.

6. A loudspeaker voice coil characterized by the ceramic insulation coated wire defined in claim 1 or the self-fusible ceramic insulation coated wire defined in claim 3.

* * * * *